T. A. E. ERRINGTON.
EXTENSION LIGHT FOR AUTOMOBILES.
APPLICATION FILED MAR. 14, 1921.
1,398,011.
Patented Nov. 22, 1921.
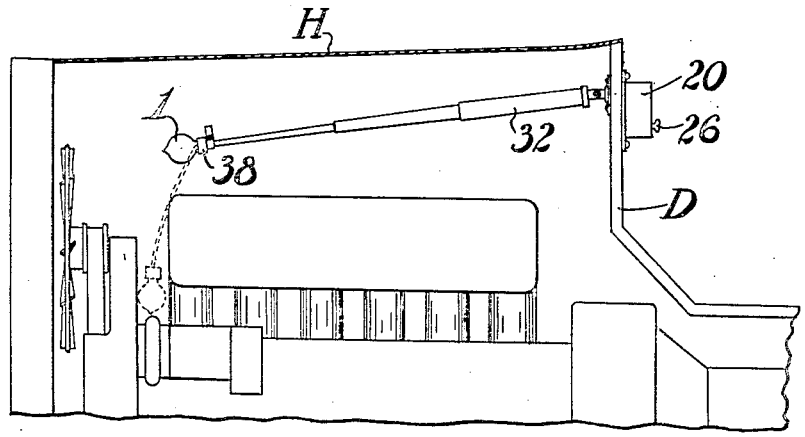
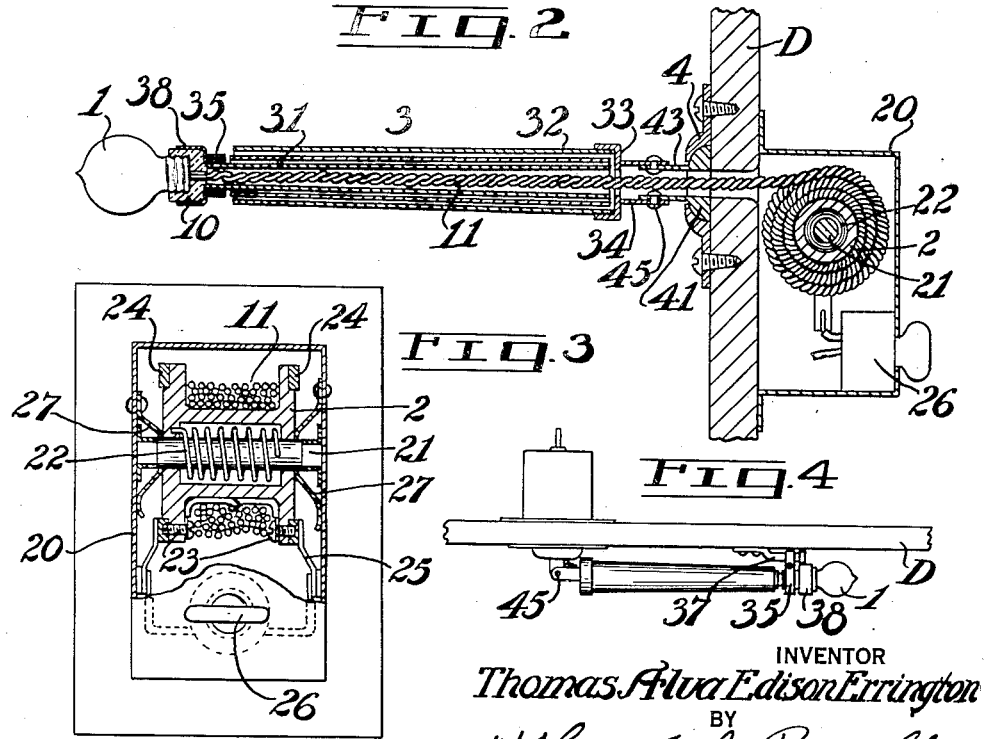
INVENTOR
Thomas Alva Edison Errington
BY
H. L. & C. L. Reynolds,
ATTORNEYS

UNITED STATES PATENT OFFICE.

THOMAS ALVA EDISON ERRINGTON, OF SEATTLE, WASHINGTON.

EXTENSION-LIGHT FOR AUTOMOBILES.

1,398,011. Specification of Letters Patent. Patented Nov. 22, 1921.

Application filed March 14, 1921. Serial No. 452,216.

*To all whom it may concern:*

Be it known that I, THOMAS ALVA EDISON ERRINGTON, a subject of the King of England, and resident of the city of Seattle, in the county of King and State of Washington, have invented certain new and useful Improvements in Extension-Lights for Automobiles, of which the following is a specification.

My invention relates to extension lamps such as are particularly adapted for use in connection with automobiles.

The object of my invention is to provide a simple and easily constructed extension lamp which may be adjusted to throw light to any part of an automobile engine which may need adjustment or repair, without the necessity of its being held by the operator, and which may be retracted within a small compass and held against breakage while the machine is running.

My invention comprises those novel parts and combinations thereof which are shown in the accompanying drawings, described in the specification, and particularly defined by the claims terminating the same.

In the accompanying drawings I have shown my invention in the form of construction which is now preferred by me.

Figure 1 is an elevation of an automobile engine and hood showing my device in use in connection therewith.

Fig. 2 is a section through my device in position to be extended over the engine.

Fig. 3 is a section through the take-up means.

Fig. 4 is a plan showing my device mounted upon the dashboard of an automobile, as it would be stowed away while the car is running.

My device is preferably mounted upon the dashboard D of an automobile with the lamp 1 beneath the hood H of the car. The box 20 containing the take-up device and the switch may be mounted upon the rear side of the dashboard, which is that side facing the driver.

The lamp 1 is mounted in a socket 10 of any suitable design mounted upon the outer end of a series of telescoping tubes 3. The socket is seated in a cup-like receptacle 38, secured upon the outer end of that tube which extends outermost, and which I have shown herein as 31. The socket 10 and lamp 1 may be withdrawn from the receptacle 38, to enable the lamp to be used in distant parts of the car. The outermost tube 32 has secured to its inner end a cap 33 which is provided with a pair of rearwardly extending pivot ears 34.

Secured upon the forward face of the dash D is a base member 4. A member 41 is swiveled in the base 4 for rotation about a horizontal axis. The member 41 has a pair of forwardly projecting pivot ears 43 which are complemental to the ears 34, the two pairs of ears being pivotally secured together by rivets 45. The member 41, the base 4 and the cap 33 all have central holes which are alined when the telescoping members are projected directly forward, and which register with the holes in the tubes 3. These holes are for the passage of wires 11 leading to the socket 10.

Mounted preferably upon the inside or rear face of the dash D is a box 20 containing the take-up device for the wires 11. A spool 2 is rotatably mounted upon a non-rotative shaft 21. A coiled spring, which is shown herein as the helical spring 22, has one end secured in the spool 2 and its other end in the shaft 21 and is mounted within a recess in the spool 2. The wires 11 are wound upon the spool 2, and an end of each wire is secured to a screw 23 which forms a binding post and extends through the end flange of the spool 2.

Preferably the spool is of insulating material, and may be made of wood if desired. Thus the screw 23 need not be insulated from the spool. Contact rings 24 are secured upon the outside of the end flanges of the spool. The screws 23 may, if desired, assist in securing these rings in place. I mount contact brushes 25 within the box 20 and insulated therefrom. These contact with the respective rings 24 and lead to a suitable source of current (not shown), through a switch indicated at 26. The switch is shown as mounted within the box 20 and as in position to be turned on and off by the driver without leaving his seat.

If desired a drag member, such as the spring washers 27, may be provided to frictionally engage the spool and prevent running out of the wires 11 farther than is desired, and to maintain these wires always under a slight tension. The spool 2 is so mounted that the wire runs off therefrom to the socket 10 in practically a straight line. The dash is apertured and the hole cut therein is alined with the holes through the member 41, the cap 33, and the inner tube 31, as shown in Fig. 2.

To position and to hold the device when not in use, I provide a clip of any suitable design, which is indicated at 35 and is secured adjacent the socket 10. This clip is adapted to engage a clip securing member 37 which is secured upon the dash D. By pivoting the device at 45, when the telescoping members have been retracted, the clip 35 may engage the clip securing member 37, to in this manner support the swinging end of the device upon the front face of the dash.

In use the telescoping parts may be extended as far as may be desired, the parts being made sufficiently long to extend the length of the hood. The entire device may be swiveled in the base 4, and the additional pivot at 45 permits the device to be swung up or down or from side to side within the hood to light any portion upon which it is desired to work. The joints and the pivot points are made sufficiently tight so that parts will remain in adjusted position and thus the two hands of the operator are left free for working upon the engine. When it is desired to use the light in a distant part of the car, the socket 11 is withdrawn from the receptacle 38, where it is held by the tension placed upon the wires 11, and the lamp and socket can be drawn out as far as the length of wire will permit.

What I claim as my invention is:

1. An extension light for automobiles comprising telescoping tubes and securing means therefor mounted upon the forward face of the dashboard for axial rotation and transverse pivotal movement near the base of the tubes, a lamp and socket carried by the outermost end of the telescoping tubes, wires connected to said socket and extending through said tubes and their securing means, and take-up means for said wires and a switch mounted upon the rear face of the dashboard.

2. An extension light for automobiles comprising a base secured upon the forward face of the dashboard, a member swiveled therein to turn about a horizontal axis, a cap pivotally secured to said member, telescoping tubes supported in said cap, a lamp and socket therefor carried by the outermost end of the telescoping tubes, wires connected to said socket, said tubes, cap, swiveled member, and base having a passage for the reception of said wires, and take-up means for said wires at their inner ends.

3. An extension light for automobiles comprising telescoping tubes and securing means therefor mounted upon the forward face of the dashboard for axial rotation and transverse pivotal movement near the base of the tubes, a lamp and socket carried by the outermost end of the telescoping tubes, wires connected to said socket and extending through said tubes and their securing means, take-up means for said wires and a switch mounted upon the rear face of the dashboard, a clip secured upon the outer end of the tubes, and a clip-securing member mounted upon the forward face of the dashboard distant from the base of the telescoping tubes.

4. An extension light for automobiles comprising a base secured upon the forward face of the dashboard, a member swiveled therein to turn about a horizontal axis, forwardly-projecting pivot ears carried by said swiveled member, a cap having rearwardly-projecting pivot ears complemental to those carried by the swiveled member and pivotally secured thereto, telescoping tubes supported in said cap, a lamp and socket carried by the outermost end of said tubes, wires passing through said tubes to the socket, the cap, swiveled member, and base having holes alined with the tubes when the latter project forward horizontally for passage of said wires, and take-up means for said wires mounted upon the rear face of the dashboard in line with said holes and the tubes.

Signed at Seattle, King county, Washington, this 7th day of March, 1921.

THOMAS ALVA EDISON ERRINGTON.